United States Patent [19]

Yen et al.

[11] Patent Number: 5,115,770

[45] Date of Patent: May 26, 1992

[54] ALUMINUM CASTING ALLOY FOR HIGH STRENGTH/HIGH TEMPERATURE APPLICATIONS

[75] Inventors: Chia M. Yen, West Bloomfield; Walter J. Evans, Canton, both of Mich.

[73] Assignee: Ford Motor Company, Dearborn, Mich.

[21] Appl. No.: 802,594

[22] Filed: Dec. 5, 1991

Related U.S. Application Data

[62] Division of Ser. No. 610,647, Nov. 8, 1990.

[51] Int. Cl.$^5$ .................. C22F 1/04; C22C 21/12; F02F 3/00
[52] U.S. Cl. .................. 123/193.6; 92/222; 420/529; 420/535; 420/590; 148/416; 148/549
[58] Field of Search .................. 123/193 P, 193 CP; 148/3, 159, 12.7, 416, 438; 164/120; 420/529, 552, 553, 535, 590; 29/888.04; 92/222

[56] References Cited

U.S. PATENT DOCUMENTS 4,643,079  2/1987  Brann et al. ............... 123/193 P
4,706,550 11/1987  Bullat ....................... 123/193 P
4,807,577  2/1989  Koutsoupidis .............. 123/193 CP Primary Examiner—E. Rollins Cross
Assistant Examiner—M. Macy
Attorney, Agent, or Firm—Joseph W. Malleck; Roger L. May

[57] ABSTRACT

An aluminum casting alloy consisting of, by weight, of 7.0-13.0% copper, 0.4-1.2% manganese, 0.21-0.40% vanadium, 0.31-0.70% zirconium; impurities limited to: less than to 0.6% Si, less than 0.8% Fe, less than 0.2% zinc, less than 0.1% Mn, less than 0.2% Ni, and the remainder being essentially aluminum. There is an absence of titanium, cobalt, molybdenum, tungsten, chromium, boron, tantalum, and niobium. The alloy has, at room temperature, a UTS of about 61 ksi, a YS of about 49 ksi, a tensile elongation of about 6%, and tensile modulus elasticity of about 11.5 MSi, a compressive yield strength of about 53 ksi, a compressive modulus of elasticity of about 18 MSi; high temperature physical properties at 500° F., after 1000 hours exposure to 500° F., comprise a tensile strength of 33 ksi or greater, a tensile yield strength of 23 ksi or greater, a tensile elongation of about 9%, and tensile modulus of elasticity of 10 msi. The alloy is fabricated by a) squeeze casting an aluminum alloy melt of such character; (b) extracting the solidified casting from the die and heat treating the casting to dissolve all alloying elements (i.e., 995°-1018° F. for 7-20 hours); and (c) aging the solution treated casting to achieve improved strength characteristics (i.e., in the range of 340°-400° F. for 5-20 hours).

2 Claims, 3 Drawing Sheets

ALUMINUM CASTING ALLOY FOR HIGH STRENGTH/HIGH TEMPERATURE APPLICATIONS

This application is a division of application No. 07/610,647, filed Nov. 8, 1990.

BACKGROUND OF THE INVENTION

1. Technical Field

This invention relates to the technology of castable aluminum alloys, and more particularly to such alloys for service at high temperatures such as in the range of 400°–600° F.

2. Discussion of the Prior Art

Traditional aluminum casting alloys (i.e., SAE 332 or 390) are strengthened by additions of one or more of the following alloying elements: Cu, Mg, Si, Ni, and Zn. These elements strengthen the alloy by solid solution strengthening and by precipitation or dispersion strengthening mechanisms involving components such as $CuAl_2$, $Mg_2Si$, $MgZn_2$, and $Al_2CuMg$. For example, in SAE 332, consisting of about 8.5–10.5% Si, 2.0–4.0% Cu, 0.5–1.5% Mg, 1.2% Fe max., 0.50% Mn max., 1.0% Zn max., 0.50% Ni max., and 0.25% Ti, compounds are formed which have been identified as $CuAl_2$, $Mg_2Si$, and $Al_2CuMg$. The SAE 332 alloy, a widely used piston alloy, has an ultimate tensile strength (UTS) property at 400° F. after ½ hour of only 23 ksi, a yield strength (YS) of 17 ksi, and an elongation of about 1%. It is known that the effectiveness of the major strengthening mechanism in most of the aluminum alloys decreases with time as the alloy is exposed to temperatures over about 350° F. Therefore, the difference observed after short-term exposure will become more pronounced with time and, after 1200 hours, will be about 19 ksi for UTS, 14 ksi for YS, and 1.5% for elongation. At 500° F., these properties become considerably worse, such as after 1000 hours, a UTS of 16 ksi, and a YS of 10 ksi. Similar restricted high temperature properties are found with the wear resistant engine bore material 390, after 1000 hours at 500° F., such as 10 ksi for UTS.

Conventional aluminum casting alloys have been used to the limits of their properties in many cases and are unable to meet a long-felt need for aluminum casting alloys having higher strength at temperatures of 400° F. or higher, particularly for automobile applications. If such an alloy were available, it would help solve many of the most urgent problems facing the auto industry, including reduction in weight and improved engine emissions. Design criteria could be extended toward higher performance with such alloys.

One approach taken by the prior art is the use of ceramic fibers, ceramic whiskers, or ceramic particulates to reinforce a conventional aluminum alloy, the so-called ceramic reinforced metal matrix composites. Unfortunately, the material and processing costs of these approaches is much too high to be considered for large volume usage in massive engine components, such as pistons.

The approach of this invention is to eliminate reliance on the Si, Mg, Ni and Zn as strengthening, and instead utilize critical amounts of Mn, Zr and V, in addition to Cu, as strengthening agents. The level tolerated of Si, Fe or Mg, as an impurity, is as low as possible, and each of Ni and Zn is limited to 0.20% maximum.

A known commercial wrought aluminum alloy 2219 (not a casting alloy) is used in forging, extrusion, and rolling; it contains Mn, Zr, V and Cu as alloying agents but in a content regime that is low and thus does not obtain the physical properties of this invention. 2219 exhibits a UTS, after exposure to 500° F. for 1000 hours, of about 29 ksi.

U.S. Pat. No. 2,706,680 (now expired) attempted to modify aluminum alloys to increase resistance to creep at high temperature (400° F.) for jet engine use. This attempt essentially eliminated Si, Mg, Zn and Ni while substantially increasing Cu (up to 13%) and Mn, (0.15–1.7%) over the 2219 alloy, accompanied by small amounts of V (0.05–0.2%) and Zr (0.05–0.3%) to improve creep resistance. Silicon was limited to 0.05–0.3% and iron limited to 0.05–0.5%. This chemistry resulted in a UTS value, after 1200 hours at 400° F., that was not much different than the conventional 390 alloy. These physical properties fall short of the goal of this invention, namely, to provide an aluminum casting alloy that at 400° F. after 1200 hours has a UTS of 42 ksi or greater, and after 1000 hours at 500° F., a UTS of 33 ksi or greater.

SUMMARY OF THE INVENTION

In a first aspect of this invention, an aluminum casting alloy has been created which attains the higher physical properties set forth above; it consists, by weight, of 7.0–13.0% copper, 0.4–1.2% manganese, 0.21–0.40% vanadium, 0.31–0.70% zirconium; up to 0.6% silicon, up to 0.8% Fe, up to 0.2% Ni, up to 0.1% Mg, up to 0.2% zinc, and the remainder being essentially aluminum. The alloy contains $Al_3(V\text{-}Zr)$ compounds in a significant ratio to Al-Cu compounds. There is an absence of titanium, cobalt, molybdenum, tungsten, chromium, boron, tantalum, and niobium.

The physical properties achieved by such alloy comprise, at room temperature, a tensile strength of about 61 ksi, a tensile yield strength of about 49 ksi, a tensile elongation of about 6%, and tensile modulus elasticity of about 11.5 MSi, a compressive yield strength of about 53 ksi, a compressive modulus of elasticity of about 18 MSi; high temperature physical properties at 500° F., after 1000 hours exposure to 500° F., comprise a tensile strength of 33 ksi or greater, a tensile yield strength of 23 ksi or greater, a tensile elongation of 9%, and tensile modulus of elasticity of 10 MSi.

In a second aspect of this invention, a method has been devised to bring out the optimum properties of such alloy, and comprises: (a) injecting an aluminum alloy melt of such character under pressure into a die and holding the pressure until solidification of the melt; (b) extracting the solidified casting from the die and heat treating the casting to dissolve all alloying elements (i.e., 995°–1018° F. for 7–20 hours followed by warm water quench at 120°–180° F.); and (c) aging the solution treated casting to achieve improved strength characteristics (i.e., in the range of 340°–400° F. for 5–20 hours). Preferably, higher quantities of silicon impurities can be tolerated by intentional toleration of similar incremental quantities of iron up to 0.8%.

A third aspect of this invention is a piston casting construction utilizing such alloy for use in an internal combustion engine having a cylindrical bore closed by a head, the casting comprising: a cylindrical piston body having depending walls for sliding movement along the walls of said bore, a piston crown integral with and extending transversely across the top of said body, at least one annular groove in the body spaced from said crown to define a limited piston lip at the juncture of said crown and body, said lip having a height no greater than 0.05 inches, said body and lip being constituted of a cast aluminum alloy having a UTS of at least 33 ksi at a temperature of 500° F. after 1000 hours.

DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DESCRIPTION OF TABULAR INFORMATION

Figure 1:
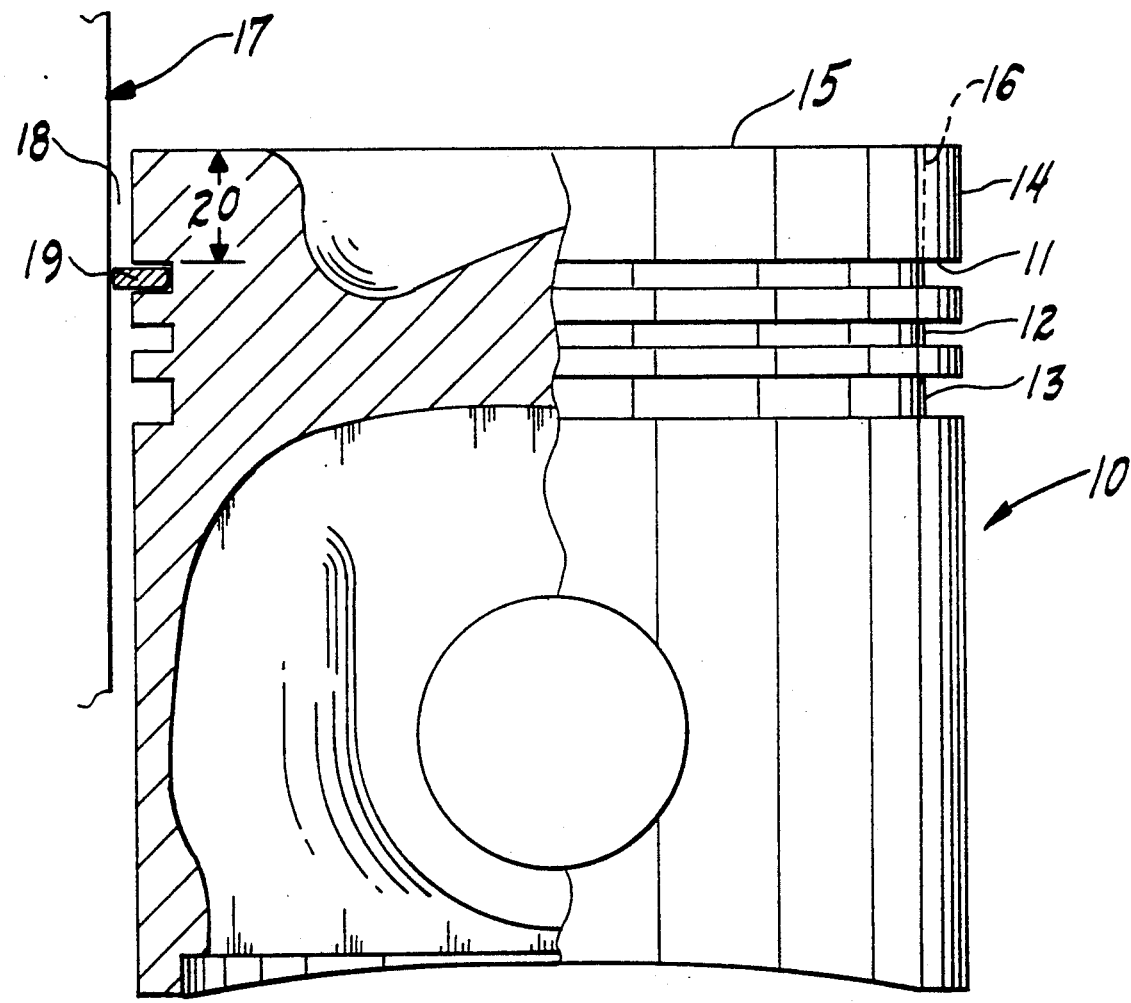
FIG. 1 is an elevational view of a typical prior art piston structure used in an automotive engine today.

Table 1 is a tabulation of chemical ingredients used for alloys that constitute the various samples for testing;

Table 2 is a tabulation of certain process conditions used with the alloys of Table I to define the samples;

Table 3 is a tabular comparison of properties with time and temperature at 400° F.; and Table 4 is a tabular comparison similar to Table 3, but at 500° F.

DETAILED DESCRIPTION AND BEST MODE

The aluminum casting alloy of this invention consists of, by weight, the following: 7.0–13.0% copper, 0.4–1.2% manganese, 0.21–4.0% vanadium, 0.31–0.70 zirconium; up to 0.6% Si, up to 0.8% Fe, up to 0.2% Ni, up to 0.1% Mg, up to 0.2% zinc, and the remainder being essentially aluminum. Such chemical content is noteworthy because of its restricted but higher content of copper and the highly increased amounts of vanadium and zirconium. Such modified alloy results in a tensile strength of 33 ksi or greater when exposed to a temperature of 500° F. for at least 1000 hours. The casting alloy is uniquely characterized by increased $Al_3(V-Zr)$ precipitates. Such alloy is also noteworthy because nickel, titanium, cobalt, molybdenum, tungsten, chromium, boron, tantalum, and/or niobium are not required in this invention but are required in U.S. Pat. No. 2,706,680.

The enhanced high temperature strength characteristics of this alloy will be detrimentally affected if the above copper and manganese levels are not adhered to. Cu lower than 7.0% or Mn lower than 0.4% will result in strength reductions on the order of 20%. Cu contents higher than 13.0% will begin to produce brittle structures and affects the strength characteristics. The controlled amount of manganese is important because if a content higher than 1.2% were to be used, a bad casting structure would be formed comprised of needle-like structures which facilitate the initiation of cracks from the end of such needles.

V and Zr contents are critically important to attaining the strength levels of this invention. A V content lower than 0.21% or Zr lower than 0.31% will result in progressive deterioration of UTS and YS at prolonged high temperatures; V higher than 0.4% or Zr higher than 0.7% will not necessarily detrimentally affect strength but will not improve strength and thus is a costly waste of additives.

Preferably, the silicon is present in an amount of 0.6% or lower and iron in an amount of 0.8% or lower. It has been found that such higher toleration of Si is made more possible by a matching incremental increase of Fe to help avoid unwanted cold structures and reduced hardness. Iron, in an amount higher than 0.8%, or silicon in an amount higher than 0.6%, is disadvantageous for this alloy because it may form excessive Al-Cu-Fe or Al-Cu-Si eutectics. These eutectics may melt during solution treatment due to their low melting points.

When the higher contents of Zr and V are utilized as taught herein and subsequently heat treated, the alloy attains unprecedented strength at prolonged high temperatures. Such property results from a critical increase in the precipitates $Al_3(V,Zr)$. Maximum high temperature strength has been attained by the inventors when using a heat treatment consisting of (i) soaking at 995°–1018° F. for 7–20 hours; (ii) quench in warm water at 120°–180° F., and then (iii) aged at 340°–400° F. for 5–20 hours. The solution treating temperature and soaking time will depend on the level of copper and the size of the casting; a high copper level and/or large casting size will normally require a higher temperature and/or longer soaking time. The solution treatment dissolves most of the alloying elements. Subsequent water quenching retains most of the elements in solution. At this stage, some strengthening of the alloy is achieved by solution hardening. During the aging treatment, submicroscopic compounds of $CuAl_2$, $Al_6Mn$, and $Al_3(V,Zr)$ are precipitated.

The higher content of zirconium and vanadium gives rise to increased $Al_3(V,Zr)$ precipitates. Such increased $Al_3(V,Zr)$ precipitates is believed to be attendant to improved high strength characteristics discovered by this invention.

Figure 3:
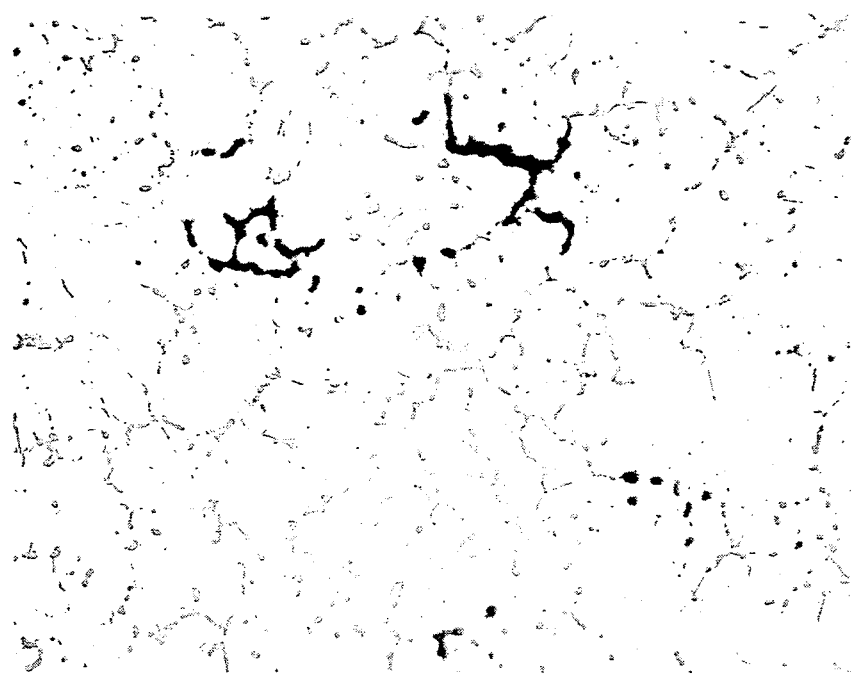
FIG. 3 is a photomicrograph showing the microstructure at 100X of a prior art alloy having 7.3% Cu, 0.25% Zr, 0.18% V, 0.65% MN, and the balance Al.
Figure 4:
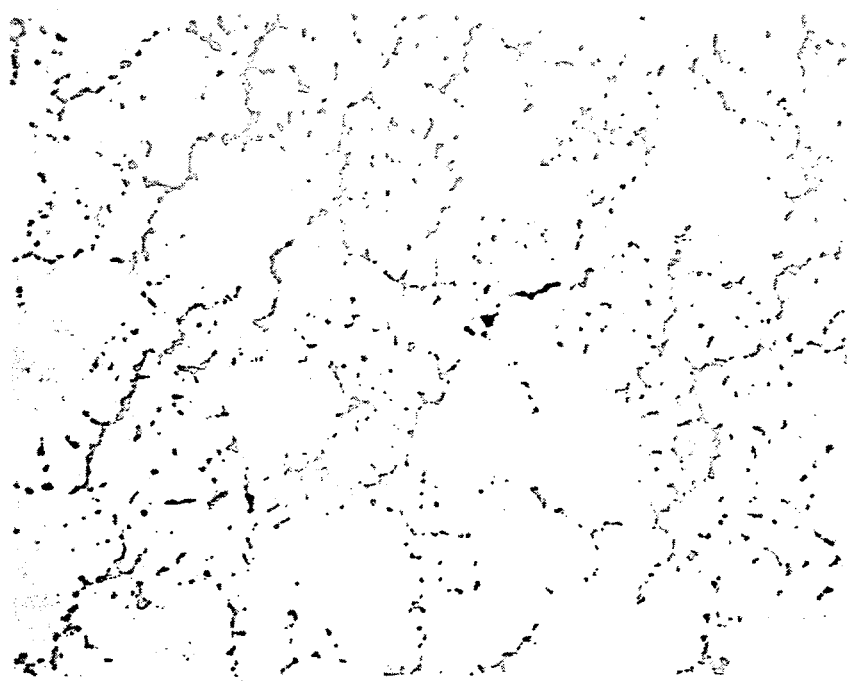
FIG. 4 is a photomicrograph at 100X of the alloy of this invention having 7.3% Cu, 0.5% Zr, 0.25% V, 0.65% MN, and the balance Al.

This alloy, like most of the multicomponent alloys, has upper and lower solidification temperatures; the range between these two temperatures is the solidification range. A smaller solidification range, as here, produces less shrinkage microporosity. The lower solidification temperature in the basic Al-Cu alloy system is the Al-Cu eutectic temperature. Higher levels of Zr and V replace more Al-Cu eutectic with Al-Cu-(Zr,V) eutectic and thus raises the lower solidification temperature because the eutectic temperature of Al-Cu-(Zr,V) is higher than that of the Al-Cu eutectic (both Zr and V have a very high melting/solidification temperature). Consequently, the lower bulk solidification temperature of the alloy is raised resulting in a smaller solidification range and thus less shrinkage microporosity, as shown by comparison of FIGS. 3 and 4. FIG. 3 shows a higher tendency for forming shrinkage microporosity (the alloy was cast, degassed and given heat treatment of this invention). FIG. 4 shows a lower tendency for forming shrinkage microporosity (this alloy was also cast, degassed and given heat treatment of this invention).

The strength of this alloy decreases at a slower rate at high temperature than prior art alloys that are closely related. The stabilized high temperature strength (strength of the material after exposure to a high temperature of 400° F. for 600 hours or more) of the alloy in this invention is about 16% higher than U.S. Pat. No. 2,706,680 and 100% higher than SAE 332.

The alloy of this invention has: (A) room temperature physical characteristics comprising a tensile strength of about 61 ksi, a tensile yield strength of about 49 ksi, a tensile elongation of about 6%, a tensile modulus of elasticity of about 11.5 MSi, a compressive yield strength of about 53 ksi, a compressive modulus of elasticity of about 18 MSi; and (B) high temperature physical properties at 500° F. (after exposure to 500° F. for 1000 hours) comprising a tensile strength of 33 ksi or greater, a tensile yield strength of 23 ksi or greater, a tensile elongation of about 9%, and a tensile modulus of elasticity of about 10 MSi.

The inventive alloy is characterized also by: (a) a high temperature fatigue strength that is at least 43% higher than SAE 332 (after $10^7$ cycles there was no failure by fatigue strength under a load of 10,000 psi; SAE 332 can only have no failure at $10^7$ cycles when under a load up to 7000 psi; the fatigue test is a push-pull, completely reversed stress cycle, R-1, at 500° F.; this is the most severe type of fatigue testing); and (b) a coefficient of thermal expansion that generally equals SAE 332.

The method aspect of this invention comprises making an aluminum-based casting having high strength at high temperatures with the following steps: (a) injecting an aluminum alloy melt containing, by weight, 7.0–13% Cu, 0.4–1.2% Mn, 0.31–0.7% Zr, 0.21–0.4% V, 0.6% S max., 0.8% Fe max., 0.2% Ni max., 0.2% Zn max., 0.1% Mg max., under pressure into a die and holding the pressure until solidification of the melt, the melt consisting of the aforementioned alloy; (b) extracting the solidified casting from the die and heat treating the casting to dissolve all alloying elements; and (c) aging the solution-treated casting to achieve optimum strength characteristics.

The cast pressure applied in step (a) is in the range of 10,000–20,000 psi. The solution heat treatment comprises heating to a temperature of 995°–1018° F. for 7–20 hours, followed by water quenching. The aging heat treatment comprises heating the solution treated casting to a temperature in the range of 350°–380° F. for 5–20 hours. It is important to note that the solution heat treatment is a critically high temperature.

If the solution heat treatment is carried out at a temperature below 995° F., there may be insufficient elements dissolved and thus high temperature strength will be detrimentally affected. If the solution treating temperature is higher than 1018° F., the aluminum-copper compounds dissolve and form a liquid phase which is not only detrimental to solution treatment but eventually affects strength. Although the time at solution treatment is not critical, it must be sufficient to allow the ingredients to dissolve adequately. The temperature of precipitation hardening should be observed; a temperature below 340° F. may not promote precipitation and a temperature above 400° F. will generate large size particles which affects strength. Time at the precipitation hardening temperature is not critical as long as it suffices to generate the precipitate. At 360° F. or lower, the period may be 40 hours or more without affecting the alloy strength; at 380–400° F., periods over 20 hours may affect strength. Although inventive benefits are achieved in using the above method, the alloy can also be fabricated by: (a) conventional gravity permanent mold casting process; (b) conventional gravity sand mold casting process. In both cases, the only pressure applied to the molten metal is its own gravity. After extracting the casting from the mold, the casting is given the same heat treatment as in the squeeze casting. This alloy has a lower tendency of forming shrinkage microporosity when cast in conventional gravity permanent mold or sand mold casting as compared to similar alloy systems which contain lower levels of V and Zr (such as alloy 2219 or the alloys claimed in U.S. Pat. No. 2,706,680) than that in this invention.

One example of the product aspects of this invention is best illustrated with reference to FIGS. 1 and 2. A conventional piston is designed to have a straight cylinder piston 10 with a plurality of annular grooves 11, 12, 13 separated from each other; the most important feature is that there must be a relatively cylindrical large wall section 14 between the crown 15 of the piston 10 and the first groove 11 to provide for sufficient wall strength across the bendable zone of such section 14. This is necessitated by the inability of prior art aluminum casting alloys to have sufficient high temperature strength that would allow such wall section 14 to be reduced.

A substantial portion of emissions from an internal combustion engine originates from incomplete combustion of gases trapped in the space 18 between the cylinder wall 17 and the piston wall section 14 immediately above the top ring 19 in groove 11. A significant lowering of emissions would be achieved by minimizing the axial length 20 of this space; this could be achieved if the top piston ring groove were moved upwardly in relationship to the crown 15 of the piston. This will reduce the volume of land material between the top ring groove 11 and the crown of the piston. But, as indicated earlier, a stronger piston alloy is mandatory to permit such design modification.

Figure 2:
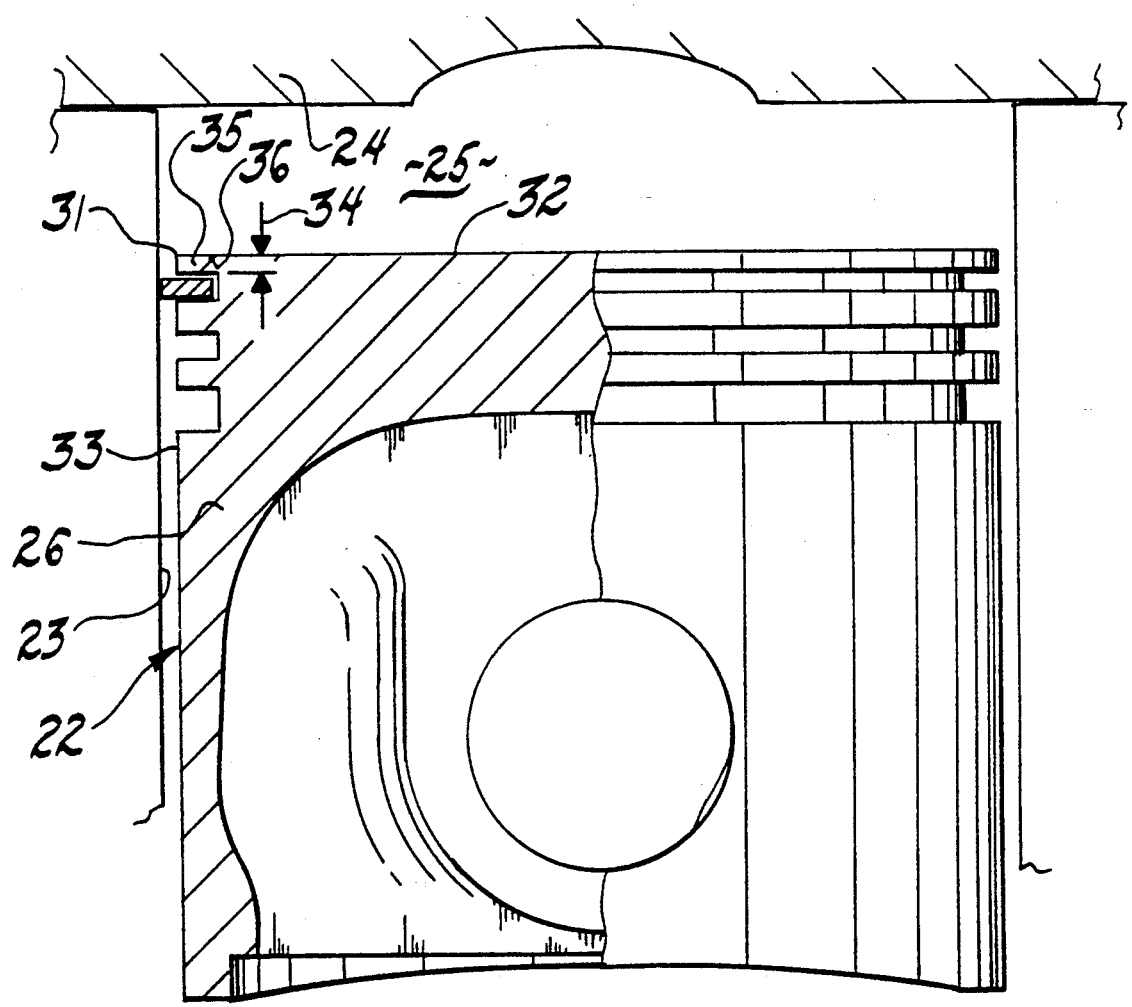
FIG. 2 is an elevational view of an improved piston construction using the high strength casting alloy of this invention.

FIG. 2 is a schematic depiction of a modified piston designed to reduce the space 18 of FIG. 1 which is an origin of a substantial hydrocarbon emission. In this modified design, the top piston ring groove is moved upward, very closely, to the crown of the piston greatly reducing the axial length 20 of FIG. 1. The shortening of axial length from 20 of FIG. 1 to 34 of FIG. 2 results in a major reduction in space 18 of FIG. 1. A prototype 1.9 liter engine piston designed according to the principle of FIG. 2 has shown a reduction in engine emission of 16% in engine testing. This new design leaves a very thin material thickness (34 of FIG. 2, the thickness between the top ring groove and the crown of the piston, the thickness may be less than 0.3" to as little as 0.1") to hold the top piston ring in place. The reduction in this material thickness greatly increases the stress at the bendable juncture 36 (FIG. 2). An ultra-high strength aluminum alloy, such as the one described in this invention, is required to sustain such high stress.

Constructing the one-piece piston configuration of FIG. 2 out of the aluminum casting alloy of this invention provides for a high temperature strength that eliminates the possibility that the high stress generated at the juncture 36 during engine operation will result in failure of the piston.

To corroborate the advantages of this invention, alloy samples having the chemical content as set forth in Table 1 were prepared according to process variations listed in Table 2. The resulting properties at 400° F. and 500° F., with exposure time from ¼ hour up to 1200 hours at respective temperature, are listed in Tables 3 and 4. These results demonstrate the criticality of the claimed chemical ranges and the improvement in high temperature strength that results from maintaining an elevated proportion of vanadium and zirconium.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

TABLE I

Alloy Chemistry (By Weight %)

| Alloy | Cu | Mn | V | Zr | Si | Fe | Zn | Mg |
|---|---|---|---|---|---|---|---|---|
| A | 7.3 | 0.60 | 0.25 | 0.40 | 0.20 | 0.30 | 0.2 | 0.05 |
| B | 7.3 | 0.60 | 0.25 | 0.50 | 0.20 | 0.30 | 0.2 | 0.05 |
| C | 8.5 | 1.10 | 0.22 | 0.33 | 0.20 | 0.30 | 0.2 | 0.05 |
| D | 10 | 0.40 | 0.45 | 0.60 | 0.20 | 0.30 | 0.2 | 0.05 |
| E | 12 | 0.80 | 0.25 | 0.70 | 0.20 | 0.30 | 0.2 | 0.05 |
| F | 7.3 | 0.60 | 0.18 | 0.25 | 0.20 | 0.30 | 0.2 | 0.05 |
| G | 3.5 | 0.50 | 0.00 | 0.00 | 9.50 | 0.80 | 0.8 | 0.70 |
| H | 3.5 | 0.50 | 0.00 | 0.00 | 9.50 | 0.80 | 0.8 | 0.70 |
| I | 3.5 | 0.50 | 0.00 | 0.00 | 9.50 | 0.80 | 0.8 | 0.70 |
| J | 4.0–5.0 | 0.10 max. | 0.00 | 0.00 | 16.0–18.0 | 1.30 max. | 0.1 max. | 0.45–0.65 |
| K | 5.8–6.8 | 0.20–0.40 | 0.05–0.15 | 0.10–0.25 | 0.20 max. | 0.30 max. | 0.10 max. | 0.02 |

Alloy A: This invention
B: This invention
C: This invention
D: This invention
E: This invention
Alloy F: U.S. Pat. No. 2,706,680
Alloy G: SAE332
H: SAE332
I: SAE332
Alloy J: 390
Alloy K: 2219

TABLE 2

| Alloys | Fabricating Processes | Heat Treating |
|---|---|---|
| A, B, C, D, E (this invention) | Squeeze casting (10,000–12,000 psi squeezing pressure) | T6:1002–1010 F./7–16 hrs + 120/180 F. water quench + 360–370 F./6–16 hrs |
| F (patent 2706680) | Squeeze casting (10,000–12,000 psi squeezing pressure) | T6:1002–1010 F./7–16 hrs + 120/180 F. water quench + 360–370 F./7–16 hrs |
| G (SAE332) | Squeeze casting (10,000–12,000 psi squeezing pressure) | T6:930–940 F./5–7 hrs + 120/180 F. water quench + 335–345 F./5–7 hrs |
| H (SAE332) | Squeeze casting (10,000–12,000 psi squeezing pressure) | T5:400 F./7 hrs |
| I (SAE332) | gravity permanent mold casting | T6:930–940 F./5–7 hrs + 120/180 F. water quench + 335–345/5–7 hrs |
| J (390) | Acurad cast | T6:925 F./7 hrs + 120/180 F. water quench + 350 F./8 h |
| K (2219) | Forging | T81:995 F./7–12 hrs + 120 F.–180 F. water quench + forging + 325–375 F./18–36 hours. |

TABLE 3

Comparison of Properties at 400 F. with Time Exposed to 400 F.

| | Hours Exposed to 400 F. | | | |
|---|---|---|---|---|
| | ½ hr | 100 hrs | 650 hrs | 1200 hrs |
| Ultimate Tensile Strength, ksi: | | | | |
| Alloy A (this invention) | 51 | 48 | 42 | 42 |
| Alloy F (patent 2706680) | 43 | 39 | 36 | 36 |
| Alloy I (SAE332) | 23 | 22 | 21 | 19 |
| Alloy J (390) | NA | NA | NA | 34 |
| Alloy K (2219) | 43 | 38 | NA | 36 |
| Yield Strength ksi: | | | | |
| Alloy A (this invention) | 45 | 42 | 31 | 29 |
| Alloy F (patent 2706680) | 38 | 26 | 26 | 25 |
| Alloy I (SAE332) | 17 | 16 | 14 | 14 |
| Alloy J (390) | NA | NA | NA | NA |
| Alloy K (2219) | 36 | 32 | NA | 30 |
| Elongation %: | | | | |
| Alloy A (this invention) | 7 | 8 | 3.5 | 5.7 |
| Alloy F (patent 2706680) | .8 | 9 | 9 | 10 |
| Alloy I (SAE332) | 1 | 1 | 1.7 | 1.5 |
| Alloy J (390) | 1< | 1< | 1< | 1< |
| Alloy K (2219) | 16 | 16 | 16 | 16 |
| Modulus of Elasticity ksi: | | | | |
| Alloy A (this invention) | 10.8 | 10.5 | 10 | 9.8 |
| Alloy F (patent 2706680) | 10.6 | 10.4 | 9.7 | 9.5 |
| Alloy I (SAE332) | 10.5 | 10.3 | 9.5 | 9.6 |

TABLE 4

Comparison of Properties at 500 F. with Time Exposed to 500 F.

| | Hours Exposed to 500 F. | | |
|---|---|---|---|
| | ½ hr | 650 hrs | 1000 hrs |
| Ultimate Tensile Strength, ksi: | | | |
| Alloy A (this invention) | 35 | 34 | 34 |
| B (this invention) | 43 | 35 | 38 |
| C (this invention) | 36 | 34 | 33 |
| D (this invention) | 37 | 35 | 35 |
| E (this invention) | 35 | 33 | 33 |
| F (patent 2706680) | 34 | 32 | 31 |
| G (SAE332) | 33 | 16 | 15 |
| H (SAE332) | 20 | 17 | 16 |
| J (390) | NA | NA | 10 |
| K (2219) | 29 | 29 | 29 |
| Yield Strength ksi: | | | |
| Alloy A (this invention) | 27 | 26 | 26 |
| B (this invention) | 38 | 27 | 27 |
| C (this invention) | 31 | 28 | 27 |
| D (this invention) | 30 | 26 | 26 |
| E (this invention) | 29 | 27 | 26 |
| F (patent 2706680) | 24 | 24 | 23 |
| G (SAE332) | 31 | 10 | 9 |
| H (SAE332) | 13 | 11 | 10 |
| J (390) | NA | NA | 10 |
| K (2219) | 25 | 24 | 24 |
| Elongation %: | | | |
| Alloy A (this invention) | 15 | 14 | 16 |
| B (this invention) | 7.4 | 8 | 9 |
| C (this invention) | 12 | 16 | 17 |
| D (this invention) | 10 | 12 | 14 |
| E (this invention) | 5 | 8 | 9 |
| F (patent 2706680) | 18 | 21 | 21 |
| G (SAE332) | 4.5 | 12 | 12 |
| H (SAE332) | 7 | 8.4 | 8 |
| J (390) | 1< | 1< | 1< |
| K (2219) | 16 | 16 | 16 |
| Modulus of Elasticity Msi: | | | |
| alloy A (this invention) | 8.6 | 9.0 | 9.0 |
| B (this invention) | 9.2 | 9.3 | 10 |
| C (this invention) | 8.0 | 8.1 | 8.5 |
| D (this invention) | 8.0 | 8.1 | 8.7 |
| E (this invention) | 8.3 | 8.5 | 9.0 |
| F (patent 2706680) | 8.9 | 8.6 | 8.5 |
| G (SAE332) | 9.8 | 10 | 10 |
| H (SAE332) | 9.0 | 7.1 | 7.7 |

We claim:

1. A piston having a plurality of annular piston ring grooves and a crown, the ring groove most adjacent the piston crown being spaced therefrom by a wall having a thickness of 0.02–0.05 inches, said wall retaining its strength characteristics at combustion chamber temperatures when deployed in an internal combustion engine with little or no dimensional change, said piston being formed of an aluminum alloy consisting of, by weight, the following: 7.0–13.0% copper, 0.4–1.2% manganese, 0.21–0.40% vanadium, 0.31–0.70% zirconium, in which the levels of V and Zr raise the bulk lower solidification temperature of the alloy resulting in a narrower solidification range to reduce the tendency of forming shrinkage microporosity when cast in a mold, and impurities limited as follows: generally equal amounts of silicon and iron totaling less than 1.4%, up to 0.2% Zn, up to 0.1% Mg, up to 0.2% Ni, the remainder being essentially aluminum, said alloy having a tensile strength of 33 ksi or greater when exposed to a temperature of 500 degrees Fahrenheit for at least 1000 hours.

2. A piston casting structure for use in an internal combustion engine having a cylindrical bore and a head over such bore, comprising:

(a) a cylindrical piston body having depending walls for sliding movement along the walls of said bore;

(b) a piston crown integral with and extending transversely across the top of said body;

(c) at least one annular groove in said body spaced from said crown to define a piston lip at the juncture of said crown and body, said lip having a height no greater than 0.05 inches, whereby such lip will be subjected to increased bending stress across the base of said lip; and (d) said body and lip being constituted of an aluminum casting alloy consisting of, by weight, 7.0–13.0 copper, 0.4–1.2% manganese, 0.21–0.40% vanadium, 0.31–0.70% zirconium, silicon less than 0.6%, iron less than 0.8%, Ni less than 0.2%, zinc less than 0.2%, magnesium less than 0.1%, and the remainder being essentially aluminum; the alloy having a tensile strength of about 38 ksi when exposed to a temperature of 500° F. for at least 1000 hours.

* * * * *